M. C. HUFF.
DRAFT ANCHOR FOR MOTOR VEHICLES.
APPLICATION FILED DEC. 18, 1912.
1,088,344. Patented Feb. 24, 1914.
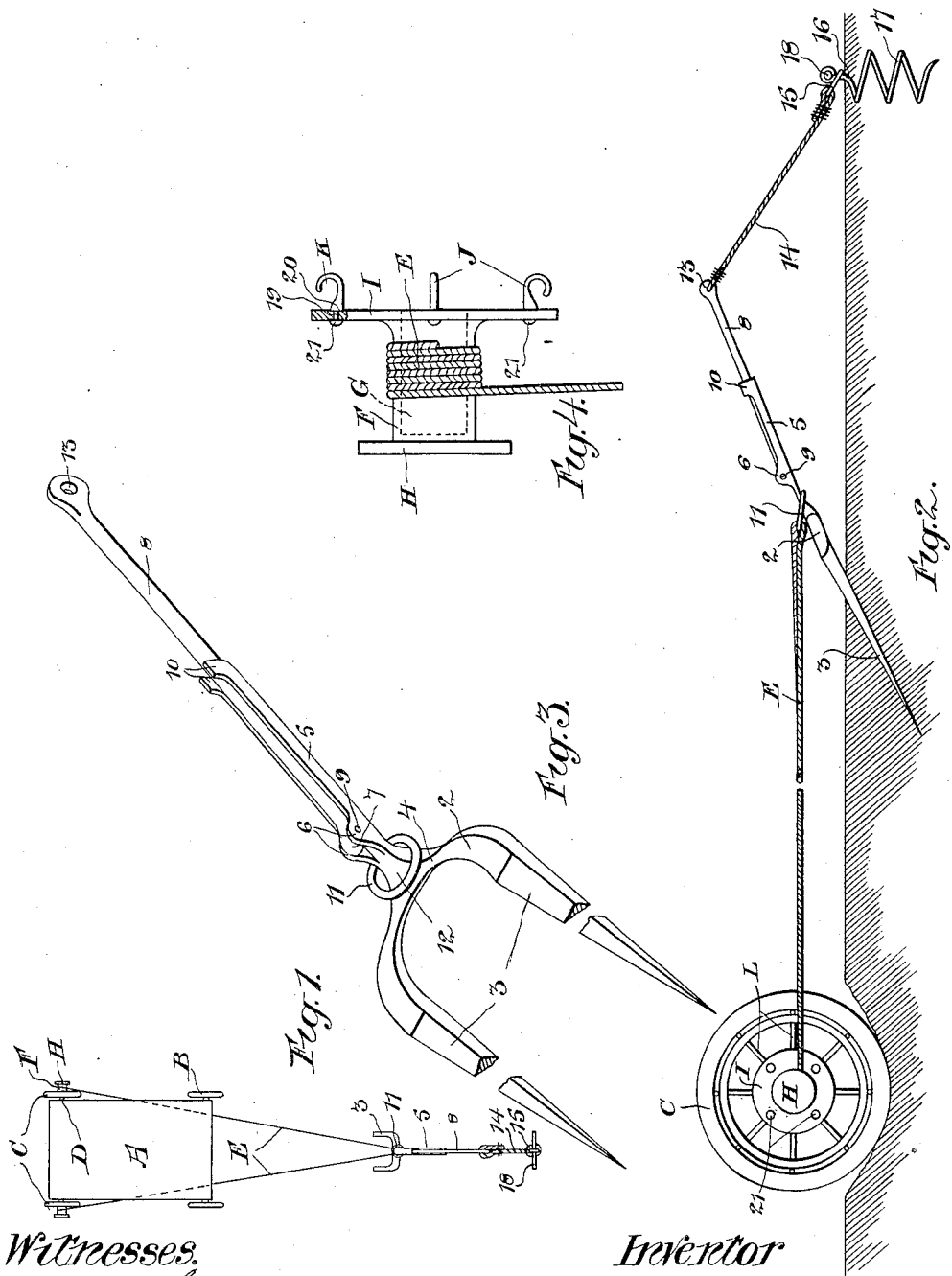
Witnesses.
Inventor

UNITED STATES PATENT OFFICE.

MARIBO CHRIS HUFF, OF BOWDEN, ALBERTA, CANADA, ASSIGNOR OF ONE-HALF TO RODERICK THOMAS WASHBURN, OF BOWDEN, CANADA.

DRAFT-ANCHOR FOR MOTOR-VEHICLES.

1,088,344.   Specification of Letters Patent.   Patented Feb. 24, 1914.

Application filed December 18, 1912. Serial No. 737,428.

*To all whom it may concern:*

Be it known that I, MARIBO CHRIS HUFF, a subject of the King of Great Britain, residing at Bowden, in the Province of Alberta, Canada, have invented certain new and useful Improvements in Draft-Anchors for Motor-Vehicles, of which the following is a specification.

This invention relates to improvements in draft anchors for motor vehicles, and the principal object of the invention is to design a draft anchor for use in connection with self propelling vehicles, particularly automobiles, whereby they may be extracted from mud holes, or drawn up the side of an embankment on to the roadway, when the vehicle is resting on its wheels, the motor carried by the vehicle being the source of power, as hereinafter more particularly set forth.

Figure 1 illustrates a diagrammatic view of an automobile and a pair of cables, showing the same connected to the rear axle of the automobile, and to my anchor. Fig. 2 is a side elevation of one of the rear wheels of an automobile, showing the same in a mud hole, and my anchor in use, the same being shown in side elevation, and held in the ground which is partly shown in section. Fig. 3 is a perspective view of the preferred form of folding anchor, and Fig. 4 is a plan view of the preferred form of means for detachably connecting the ends of the rope or cable to the vehicle.

In the drawings, like characters of reference, indicate corresponding parts in each figure.

The invention will now be described as used in connection with an ordinary automobile.

A is the automobile body, and B the front wheels thereof.

C are the rear or driving wheels carried by the driving axle D.

E is a rope or cable, the free ends of which are suitably detachably connected to the rear or driving wheels C.

The preferred means for adjustably connecting the free ends of the rope or cable E to the driving wheels C is constructed as follows: F are sleeves or drums which are designed to slip over the outer ends G of the driving axle D, and these sleeves or drums are provided with flanges H and I. By any well-known construction, not necessary to particularly illustrate, the ends of the rope or cable E are connected to the sleeves or drums F, as illustrated particularly in Fig. 1. The flanges I are provided with any suitable adjustable coupling means whereby the said sleeves or drums are temporarily coupled to the driving wheels. The preferred means for this purpose comprises a plurality of open hooks J adjustably mounted in their respective flanges I by any suitable construction, and the open ends K of the said hooks are designed to engage with the spokes L of the wheels C and so couple the said sleeves or drums to the said wheels.

The preferred construction of anchor comprises a head 2 which is provided with a pair of prongs 3 which are designed to be shoved into the ground, preferably at the angle shown in Fig. 2. The prongs 3 are connected together by the yoke 4 with the neck 12 of which is integrally formed the extension 5. The said extension is integrally provided with a pair of ears 6 between which rests the head 7 of the anchor bar 8. 9 is a pin held in said ears and passing through the said head and pivoting the same in extension 5. The said extension is preferably U-shaped in cross section for the major portion of its length, and at its outer end it is provided with a pair of lugs 10 spaced apart, and which preferably project above the said anchor bar 8. This anchor bar normally occupies the position illustrated in Figs. 2 and 3, and as it rests, for a considerable distance, within the extension 5 and between the lugs 10, the lateral support thus given to the said anchor bar prevents lateral strain being exerted against the pin 9. 11 is a ring or other suitable coupling means which is mounted on the neck 12, and through this coupling means is passed the rope or cable E. The anchor bar 8 is preferably provided with an eye 13 to which is coupled one end of the stay 14, which is preferably flexible, and may be made of rope or cable. The other end of the stay 14 is coupled to the ring 15 which is mounted on the upper end 16 of the spiral anchor 17 which is intended to be screwed into the ground. A cross bar 18 or equivalent means is carried by the upper end of the spiral anchor 17, and the ring 15 is retained on the upper end 16 by the said cross bar.

Should the self propelling vehicle be stuck in a mud hole, sleeves or drums F are connected to the vehicle as before described, and as soon as the anchor and its stay have been properly positioned, the motor of the vehicle is started and as the rope or cable E is wound around the sleeves or drums F, the vehicle must of necessity be extracted from the mud hole. When the vehicle has been placed on firm ground, the sleeves or drums F are uncoupled from the wheel C and then removed from the ends G. The anchoring means for the said rope or cable is then removed from the ground and the device is ready to be stowed away in the vehicle. By means of the construction already described, the anchor bar 8 may be folded against the head 2 so that the anchor proper may occupy a minimum space. The open hooks J are preferably provided with reduced ends 19 thus providing shoulders 20. These reduced ends are provided with rounded rivet heads 21 so that they will offer the minimum amount of interference to the rope or cable E.

Various changes in construction may be made without departing from the spirit of this invention and the scope of the appended claims.

Claims.

1. A portable anchor, comprising a head provided with a pair of prongs spaced apart, and extending beyond one side thereof in a parallel relationship; an extension integrally formed with said head, and extending in a direction opposite to that of said prongs, and substantially U-shaped in cross section and provided near its lower end with a pair of pierced ears; an anchor rod resting in said extension with its head positioned between said ears; a pin held in said ears, pivoting said head therebetween, and a pair of lugs carried by the upper end of said extension and one on each side of said anchor bar, the whole being arranged as set forth.

2. A portable anchor, comprising a head provided with a pair of prongs spaced apart, and extending beyond one side thereof in a parallel relationship; an extension integrally formed with said head, and extending in a direction opposite to that of said prongs, and provided near its lower end with a pair of alined pierced ears; an anchor rod designed to rest against said extension when in operative position, the head of said rod positioned between said ears and pivoted thereto, and means associated with said extension and said rod, whereby when the said rod is in operative position, the same will be supported laterally.

3. A portable anchor comprising a head provided with a pair of prongs spaced apart, and extending beyond one side thereof in a parallel relationship; a stem integrally formed with said head and extending in a direction opposite to that of said prongs; a rod pivoted at its lower end to said stem near said head so that the anchor may be folded, and means associated with said stem and rod to laterally support said rod when in operative position.

In testimony whereof I affix my signature in presence of two witnesses.

MARIBO CHRIS HUFF.

Witnesses:
DRUSCILLA WASHBURN,
H. E. SHENFIELD.

---

Copies of this patent may be obtained for five cents each, by addressing the "Commissioner of Patents, Washington, D. C."